United States Patent [19]

Laidely

[11] Patent Number: 4,619,544
[45] Date of Patent: Oct. 28, 1986

[54] BUSHINGS

[76] Inventor: Peter Laidely, 31 Dibley Street, Wooloongabba, 4012 Queensland, Australia

[21] Appl. No.: 546,398

[22] Filed: Oct. 28, 1983

[30] Foreign Application Priority Data

Nov. 1, 1982 [AU] Australia ............................. PF6606

[51] Int. Cl.⁴ ............................................. F16C 11/06
[52] U.S. Cl. ................................... 403/162; 403/225; 16/2
[58] Field of Search ...................... 16/2; 403/225–228, 403/162; 295/35; 267/54 R

[56] References Cited

U.S. PATENT DOCUMENTS

| | | | |
|---|---|---|---|
| 1,428,252 | 9/1922 | Ortman | 267/54 R |
| 2,240,709 | 5/1941 | Mead | 403/227 |
| 2,276,049 | 3/1942 | Leighton | 16/2 |
| 3,400,952 | 9/1968 | Swenson et al. | 16/2 |
| 3,801,209 | 4/1974 | Matsuoka | 403/225 |
| 4,152,085 | 5/1979 | Brisson | 403/227 |
| 4,285,447 | 8/1981 | Fairbank | 403/225 |

Primary Examiner—Donald R. Schran
Assistant Examiner—James L. Wolfe
Attorney, Agent, or Firm—Renner, Otto, Boisselle & Lyon

[57] ABSTRACT

A bush assembly for a vehicle suspension system has an inner sleeve which locates within aligned apertures in spaced support members. The inner sleeve is located by opposed hollow plug members, each having a flange which engages the outer face of respective support members and a boss which extends through the respective support members into the interior of the inner sleeve. The inner sleeve may be continuous or comprised of two tubular portions. The assembly is locked together by a bolt extending through the hollow plugs and inner sleeve(s).

9 Claims, 6 Drawing Figures

BUSHINGS

This invention relates to improved bushings particularly suitable for heavy vehicle suspensions.

Typical highly loaded bushings on truck or trailer suspensions are those bushings located in the eye at each end of a walking beam and forming the connection between the walking beam and a hanger bracket on the vehicle axles. These bushings transfer the weight from the axles to the chassis through a central bearing whereby the beam may pivot for load sharing between the axle assemblies.

Typically the bushing includes an outer part formed as a steel bound rubber bush and having an outer steel bush formed as an interference fit in the eye of the walking beam and a steel inner bush of the same nominal length as the inside clear spacing between the hanger bracket cheek plates between which the bushing is clamped. Such bushing outer parts were originally supported by an inner continuous tube which passed through the outer part and locating apertures in the cheek plates. This tube was secured by nuts threaded on the outside of the tube. Such assemblies had the disadvantage of difficult assembly procedures due to the length of the continuous supporting tube. It must be appreciated that such bushings are frequently located in relatively inaccessible locations. For example, access for removal and replacement of the bushing could be hindered at one side by the brake assembly and at the other side by a differential.

In a later development the inner part was formed as two flanged plugs which were used to locate the outer part. These were used to reduce the length of components to be inserted through the cheek plates of the hanger brackets. One plug passed through each cheek plate into the inner bush and the plugs were secured in position by a through bolt. The plug flanges were truncated at a tangent to the plug journal to further facilitate assembly. In use the combination of bolt tension and working loads frequently caused cracking of the plugs at the root of the flange and mostly initiating from the truncated portion of the flange.

A later development utilizes an inner part comprising a three-piece assembly comprising a pair of end plugs and an intermediate sleeve supported about the adjacent reduced diameter ends of the plugs. This sleeve was aimed at providing full load support to the central section of the bushing. In order to further reduce component lengths for ease of assembly the end plugs were recessed to enable the head of the through bolt which clamped the parts together and nut therefor to be accommodated within the plug ends. This arrangement necessitates the use of a relatively small diameter through bolt. This bolt serves to maintain the components in position and more importantly it is tensioned to clamp the inner bush of the outer part between the cheek plates to prevent its rotation with rotation of the outer bush fixed into the eye of the walking beam such that all relative rotation between the inner and outer bushes is accommodated by the rubber bush. Such arrangements generally work effectively when operated on good roads, but are prone to failure when high working loads are applied.

Failure is generally initiated as a result of rotation of the inner bush of the outer part resulting from inadequate bolt tension. When the inner bush rotates, wear occurs in the supposedly non-wearing metal components of the bushing and both the inner bush of the outer bushing part and the intermediate sleeve of the inner part can fail. Eventually the corners of the reduced diameter ends of the end plugs become rounded and the eye of the walking beam becomes wedged between the inner ends of the plugs, applying excessive tension to the through bolt and resulting in a tension failure of the bolt and total failure of the connection between the walking beam and the supporting axle. Of course this can have disastrous results in use.

It has been found in practice that sufficient clamping tension cannot be applied by the biggest bolt that can be accommodated in such assemblies, bearing in mind that the bolt size is limited not only by the size of the recess in the end plugs, but also by the length of the bolt and end plugs which can be inserted where assembly access is limited. In this respect the end plugs have to be fed axially through the locating apertures in the cheek plates of the hanger bracket and when in position the bolt has to be fed axially through the positioned end plugs. Thus there must be a full bolt length clearance between the entrance to the bolt aperture and any adjacent obstruction. It is for this reason that the end plugs are recessed so as to provide increased installation clearance.

The present invention aims to alleviate the disadvantages associated with such prior art devices and to provide a bushing which will be reliable and efficient in operation. Other objects and advantages of the present invention will hereinafter become apparent.

With the foregoing and other objects in view, this invention resides broadly in a bushing for supporting an eye member between a pair of supporting apertures in spaced supported members for relative pivotal movement, said bushing when operatively disposed including a sleeve assembly extending between said supporting members with an end portion thereof located in one said supporting aperture; a pair of end plug assemblies for said sleeve assembly and supported by said supporting members and a tensionable connector passing through said plug assemblies for operatively securing each said plug assembly in a respective said supporting aperture.

Preferably the sleeve assembly is a one piece continuous sleeve. Suitably, the respective ends of the sleeve are adapted to extend part way into the locating aperture in the respective supporting members. Alternatively each or one end could extend to a position adjacent the outer face of said supporting members. The sleeve assembly could include two sleeve portions each connectible to a respective end plug.

It is also preferred that each end plug has a retaining flange adapted to abut the respective outer face of said supporting members. Alternatively each or one of the locating apertures could be tapered and each or one of the end plugs could be correspondingly tapered to prevent passage of the end plug inwardly through the supporting member. Preferably the end plugs each have a reduced diameter inner end portion adapted to support the sleeve assembly. These end portions could be formed as a sliding or interference fit in the sleeve assembly. Preferably the tensionable connector is in the form of a bolt having a head portion adapted to engage about the outermost face portion of one end plug.

In a further aspect the bushing includes a resilient outer bush assembly having substantially concentric inner and outer rigid bushes and an intermediate resilient bush secured therebetween. Preferably the length of the inner bush is substantially equal to the distance between the supporting members and the internal diameter of the inner bush fits neatly about said sleeve assembly. It is also preferred that the sleeve assembly is not clamped tightly between said end plugs when said tensionable connector is tightened to clamp said inner bush between said supporting members.

In a preferred form at least one end plug has an outer locating part extending inwardly from a retaining flange and which extends in use part way through and is located by the locating aperture in one supporting member, and an inner reduced diameter part which extends into said sleeve assembly.

In order that the invention may be more readily understood and put into practical effect, reference will now be made to the accompanying drawings which illustrate a prior art bushing and preferred embodiments of the present invention and wherein.

Figure 2:
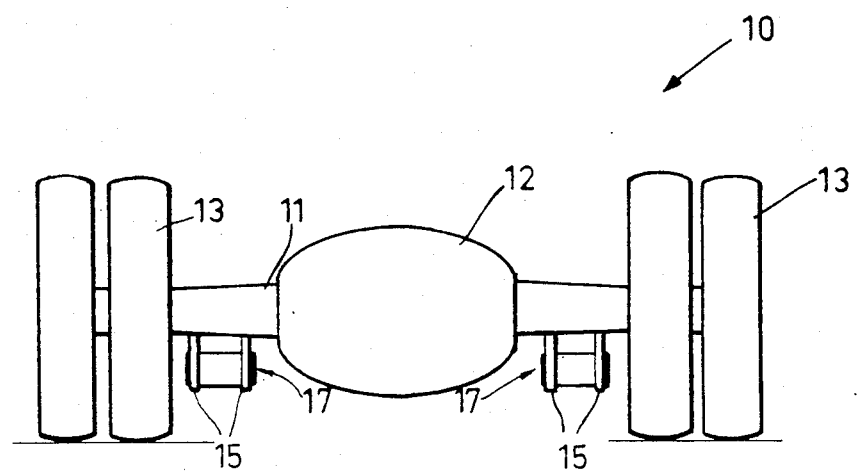
FIG. 2 is a diagrammatic end view of the axle assembly.
Figure 1:
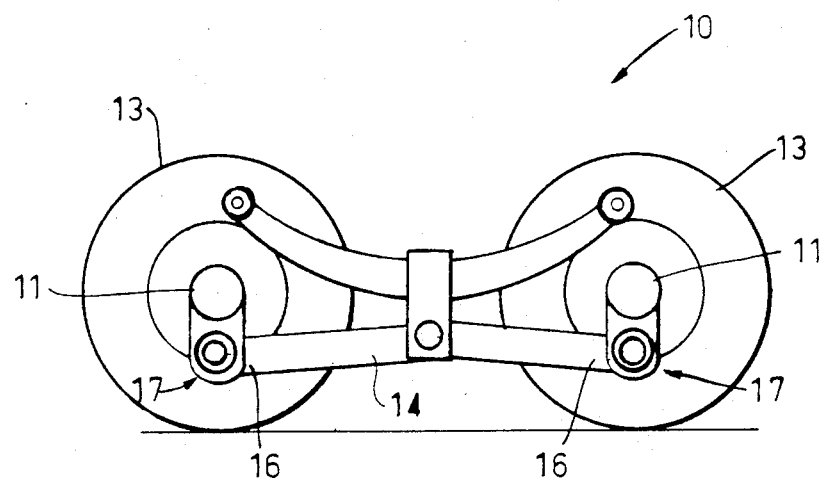
FIG. 1 is a diagrammatic side view of a typical heavy duty axle assembly.

Referring initially to FIGS. 1 and 2, it will be seen that a typical heavy duty axle assembly 10 includes a pair of axles 11, one or both of which may be driven. The axle assembly may include a differential 12, wheels 13 and brakes therefor and a sprung walking beam 14 connected at each end to spaced mounting plates 15 on the underside of the axle 11. The opposite end portions 16 of the walking beam pass between the cheek plate 15 of a hanger bracket and are connected thereto by a bushing 17.

Figure 3:
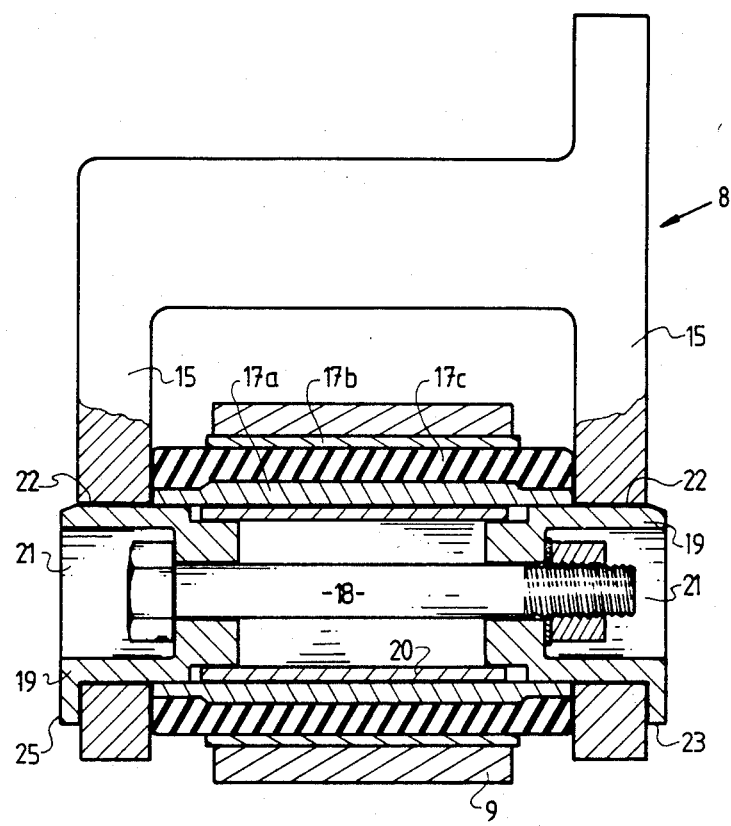
FIG. 3 is a cross-sectional view of a typical prior art bushing forming the connection between the axle and the walking beam.

In a typical prior art device, as illustrated in FIG. 3, it will be seen that the end portion 16 of the walking beam is provided with a supporting eye 9 which is adapted to be supported by an outer resilient bushing assembly 17 between the cheek plates 15 of a hanger bracket 8. For this purpose there is provided an inner three part bushing held together by a recessed through-bolt 18. This bushing includes a pair of flanged end plugs 19 having reduced diameter end portions spaced inwardly of the cheek plates 15. These portions receive a sleeve 20 which interconnects the end plugs 19. It will be noted that the bolt 18 is recessed into the end plugs 19 and thus the bolt diameter is limited to that having a head which can fit into and be tightened within the recess 21 formed therein. This results in the use of a relatively short bolt 18 of small diameter. This has been provided to enable the bolt to be inserted without interference from adjacent components such as the differential and brake assemblies. Of course relatively shorts bolts are prone to work loose in service especially when highly loaded in an axial direction and this can lead to failure as discussed above. The bolt 18 has to be tightened sufficiently to clamp the inner steel sleeve 17a between the cheek plates 15 so that relative movement of the outer steel sleeve 17b held in the supporting eye 9 is accommodated only by flexing of the resilient bush 17c.

Furthermore it will be seen that the diameter of the body part of the end plugs is substantially equal to the diameter of the locating apertures 22 through the cheek plates 15 and thus each end portion has to be withdrawn and/or inserted in an axial direction for removal from or fitting to the lugs. Thus considerable clearance is required at the side of the cheek plates to enable the bolt and/or plugs to be fitted. It will also be seen that the top portion of the flange 23 has been removed to provide extra clearance to facilitate removal.

These bushings can fail in many ways but a typical example is given by way of illustration. As the bolt 18 becomes loose the load from the end portions 16, which is applied offset to the lugs, causes wear to commence at the shoulders of the end plugs. The inner bush can fail and the mating shoulders become ramped or tapered so that normal vertical loadings are converted into end loadings and the resultant axial load applied can in time either break the bolt 18 or break the locating flange 23 from the body of the end plug 19.

Figure 4:
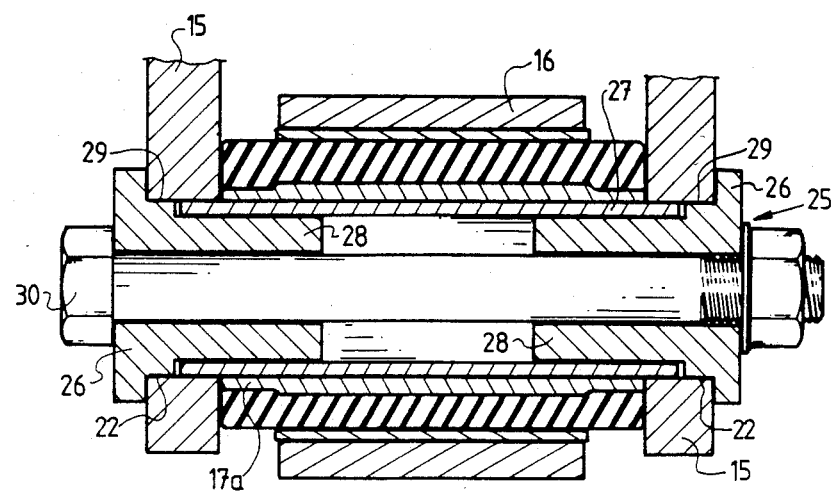
FIG. 4 is a cross-sectional view of a bushing made in accordance with one aspect of the present invention.

In a preferred form of the present invention as illustrated in FIG. 4, it will be seen that the inner bushing 25 includes end plugs 26 interconnected by a continuous sleeve 27. The reduced diameter parts of the end portions 26 about which the sleeve 27 locates, extend substantially along the full length of the respective body portions 28 such that the sleeve 27 extends into and locates positively within the locating apertures 22 in the cheek plates 15. Furthermore, the sleeve 27 is supported along a major portion of its length by the end portions 28. This construction is possible since in use, the end portions after initial extraction to release the locating parts 29 from the locating apertures 22, may be tilted for extraction or likewise for inertion, after being released from the sleeve 27. Of course the sleeve 27 can be moved in the opposite direction to free it from the end plug 26. Thus the length restrictions which limit the length of the prior art devices do not apply to the same extent with this bushing 25. Furthermore, offset loading resultant from loads applied by the supporting eye 9 will not tend to tilt the end portions since the sleeve 27 is positively located in the spaced cheek plates 15.

Figure 5:
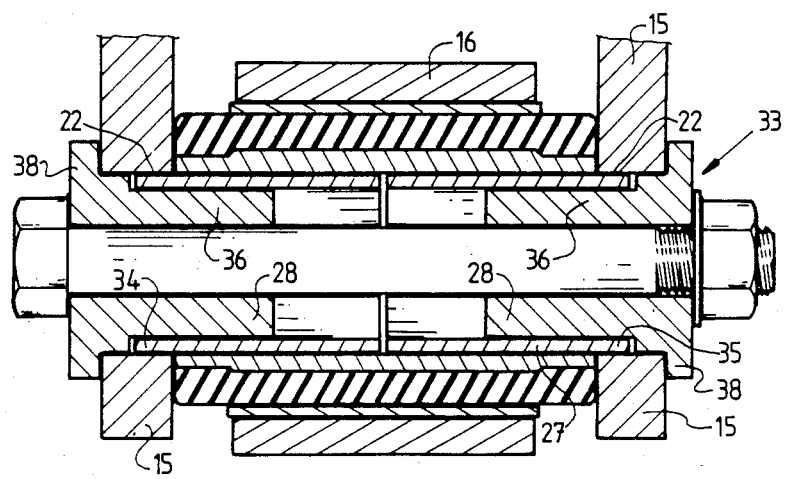
FIG. 5 illustrates a further embodiment of the present invention.

This effect is further enhanced by the provision of a through bolt 30 which extends between and beyond the cheek plates 15. The use of such a through bolt permits a relatively large diameter bolt to be used to further enhance the durability of the bushing 25 as sufficient tension can be applied to prevent rotation of the inner bush 31. Of course, if desired a smaller recessed bolt could be used. However in practice the larger bolt is preferred since frequently it is necessary to apply relatively large tightening torques to clamp the inner bush 17a tightly between the cheek plates 15. The use of the longer bolt 30 is permitted as it can be installed through the adjacent end plug 15 when the latter is tilted with respect to the axis of the bushing 25.

Where access is very restricted the bushing 33 illustrated in FIG. 5 may be utilized. This bushing 33 differs from the bushing 25 in that the sleeve assembly 32 is not a one piece member spanning between the cheek plates 15. In this embodiment the sleeve assembly 32 is a two part member as illustrated and comprising individual sleeve parts 34 and 35 respectively. If desired the end portions 36 can be formed as an interference fit in the respective sleeve portion and of course their length may then be reduced if desired.

Figure 6:
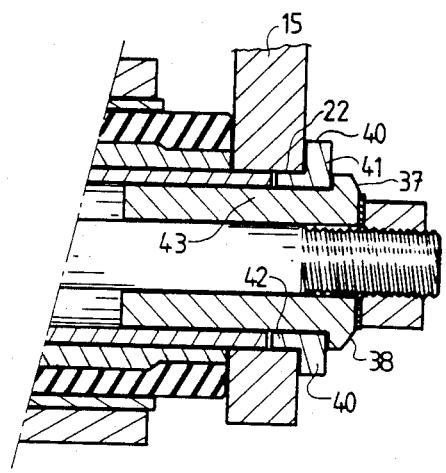
FIG. 6 illustrates in cross-section an end portion of a bushing showing yet another embodiment of the present invention.

If access at one side of the cheek plates 15 is further restricted, such as by a differential housing or otherwise, then the bushing illustrated in FIG. 4 or FIG. 5 may be modified as shown in FIG. 6.

In this modified form, the or each end plug 26 is replaced by the end plug 37 which has a major diameter at the flange 38 which is less than the diameter of the locating apertures 22 through the or each cheek plate 15. In this embodiment the end plug 37 is prevented from axial retraction through the cheek plate 15 by the use of a pair of collets 40 which each have a retaining flange portion 41 and a locating portion 42 which seats snugly in the respective locating aperture 22 about the body portion 43. This end plug 37 may be inserted from the inside of the cheek plate 15 to pass therethrough whereupon the collets 40 are inserted to prevent retraction as aforesaid. If access is so limited at that side of the bushing that the bolt and nut arrangement cannot fit, the latter may be replaced with a shorter bolt engaging in the bore of the end plug 37 which of course would be threaded internally. In such an assembly the bolt would not extend outwardly past the cheek plate 15.

In each of the above embodiments it will be noted that the retaining flange has not been relieved to provide further clearance however such modification could be made if desired. Additionally, if desired, the sleeve or sleeve parts could extend fully along the body part of the end portions to abutt or be retained adjacent the respective retaining flange. In such embodiment only the sleeve would contact the passages in the lugs and the body part would be fully located by the sleeve assembly. It will be seen that the eye member 9 has continuous support across its full width and particularly adjacent the cheek plates 15.

Of course the above has been given by way of illustrated example only of the invention and it will be understood that all such modifications and variations to the described embodiments as would be apparent to persons skilled in the art are deemed to fall within the broad scope and ambit of the present invention as is defined in the appended claims.

I claim:

1. In an assembly for supporting an eye member or the like, having an aperture therein, between a pair of spaced supporting members at respective supporting apertures therein for relative pivotal movement, a bushing comprising support sleeve means of rigid material extending through the aperture in the eye member in supporting relationship therewith and between the supporting members with at least one end of said support sleeve means extending only part way into a respective supporting aperture for supporting engagement therewith, a pair of end plug means for holding said support sleeve means between the supporting members, and tensionable connector means passing through said end plug means and said support sleeve means for securing each end plug means in respective supporting apertures of the supporting members, at least the end plug means at said one end of said support sleeve means including an outer end portion engaging the outer side of the respective supporting member, an inner end portion within said support sleeve means for supporting engagement therewith, and an intermediate portion between said outer and inner end portions extending only part way into the respective supporting aperture short of said one end of said support sleeve means.

2. A bushing according to claim 1, wherein both ends of said support sleeve means extend only partway into respective supporting apertures of said supporting members for supporting engagement therewith, and each end plug means includes an outer end portion engaging the outer side of the respective supporting member, an inner end portion within said support sleeve means for supporting engagement therewith, and an intermediate portion between said outer and inner end portions extending only partway into respective supporting apertures short of the respective end of said support sleeve means.

3. A bushing according to claim 2, further comprising a resilient sleeve member supported on and concentric with said support sleeve means.

4. A bushing for supporting an eye member between a pair of supporting apertures in spaced supporting members for relative pivotal movement, said bushing when operatively disposed including a sleeve of non-resilient material extending between said supporting members with end portions thereof extending part way into respective ones of said supporting apertures for locating engagement therewith; a pair of end plugs for supporting said sleeve assembly and supported by said supporting members; and a tensionable connector passing through said end plugs for operatively securing each said plug in a respective one of said supporting apertures, said end plugs each including an outer flange portion, an inner portion adapted to be accommodated within said sleeve for supporting and locating engagement with said sleeve, and an intermediate locating portion between said outer portion and inner portion adapted to be supported by and to extend part way into the respective supporting aperture terminating short of the respective end portion of said sleeve.

5. A bushing according to claim 4, wherein said sleeve is constituted by a one piece sleeve.

6. A bushing according to claim 4, wherein said sleeve is constituted by a pair of substantially identical sleeve sections.

7. A bushing according to claim 5, wherein each sleeve section is an interference fit about a respective inner portion of said end plugs.

8. A bushing according to claim 4, wherein said tensionable connector is a bolt having a head which seats against the outermost surface of one said end plug.

9. A bushing according to claim 4, wherein there is provided an outer bush fixed into said eye member and supported about said sleeve and said outer bush being clamped between said supporting members.

* * * * *